United States Patent [19]

Lachman et al.

[11] Patent Number: 4,631,269

[45] Date of Patent: Dec. 23, 1986

[54] MONOLITHIC CATALYST SUPPORTS INCORPORATING A MIXTURE OF ALUMINA AND SILICA AS A HIGH SURFACE AREA CATALYST SUPPORT MATERIAL

[75] Inventors: Irwin M. Lachman; Lawrence A. Nordlie, both of Corning, N.Y.

[73] Assignee: Corning Glass Works, Corning, N.Y.

[21] Appl. No.: 739,627

[22] Filed: May 31, 1985

Related U.S. Application Data

[63] Continuation-in-part of Ser. No. 712,886, Mar. 18, 1985, abandoned, and Ser. No. 712,875, Mar. 18, 1985, abandoned.

[51] Int. Cl.$^4$ .................. B01J 21/12; B01J 20/28
[52] U.S. Cl. ..................................... 502/439; 502/263
[58] Field of Search ................ 502/527, 439, 64, 263, 502/351, 355, 524

[56] References Cited

U.S. PATENT DOCUMENTS

| | | | |
|---|---|---|---|
| 3,380,933 | 4/1968 | Michel et al. | 502/527 X |
| 3,637,525 | 1/1972 | O'Hara | 252/432 |
| 3,948,810 | 4/1976 | Hervert | 502/527 X |
| 3,954,672 | 5/1976 | Somers et al. | 502/527 X |
| 3,986,978 | 10/1976 | Michalko | 252/317 |
| 4,039,474 | 8/1977 | Feistel et al. | 252/455 |
| 4,129,522 | 12/1978 | Michalko | 252/455 |
| 4,151,121 | 4/1979 | Gladrow | 252/455 |
| 4,220,559 | 9/1980 | Polinski | 252/455 |

FOREIGN PATENT DOCUMENTS

| | | | |
|---|---|---|---|
| 1142800 | 2/1969 | United Kingdom | 502/527 |
| 1581628 | 12/1980 | United Kingdom | |

OTHER PUBLICATIONS

Alcoa Technical Paper No. 11, Second Revision 1960.
"Controlled Pore Sizes and Active Site Spacings Determining Selectivity in Amorphous Silica-Alumina Catalysts", Mark R. S. Manton and John C. Davidtz, Journal of Catalysis 60, 156-166 (1979).
"Effect of Support on Noble Metal Catalysts for Three-Way Converisons", Gwan Kim and James M. Maselli, Society of Automotive Engineers, 1977.
"Chemistry of the Surface and the Activity of Alumina-Silica Cracking Catalyst", M. W. Tamele, Faraday Society Discussions, No. 8, 270-279, (1950).
"Quick Reference Guide", Davison Chemical Company Product Bulletin.
"Typical Properties and Characteristics Norton Ceramic and Zeolite Catalyst Carriers", Norton Chemical Company Product Bulletin, Oct. 1981.

*Primary Examiner*—Carl F. Dees
*Attorney, Agent, or Firm*—R. N. Wardell; G. H. Levin

[57] ABSTRACT

Monolithic catalyst support structures in which a support phase of high surface area oxide material is disposed on or within a sintered ceramic material are improved by using a mixture of alumina and silica as the high surface area oxide support phase. The mixtures of alumina and silica retain higher surface area, after firing or exposure to elevated service temperatures, than does either component individually, and thereby impart higher overall surface area to the monolithic support structures.

15 Claims, No Drawings

MONOLITHIC CATALYST SUPPORTS INCORPORATING A MIXTURE OF ALUMINA AND SILICA AS A HIGH SURFACE AREA CATALYST SUPPORT MATERIAL

CROSS-REFERENCE TO RELATED APPLICATIONS

This application is a continuation-in-part of commonly-assigned application Ser. No. 712,886, filed Mar. 18, 1985, in the names of Irwin M. Lachman and Carlo Golino; and commonly-assigned application Ser. No. 712,875, filed Mar. 18, 1985, in the names of Irwin M. Lachman, Pronob Bardhan, and Lawrence A. Nordlie both pending.

BACKGROUND OF THE INVENTION

This invention is directed to monolithic catalyst support structures having a sintered ceramic structural phase and a high surface area support phase disposed on or within the ceramic. The invention is particularly directed to catalyst support structures of this kind which are improved by using a mixture of alumina and silica as the high surface area phase.

Conventional ceramic monolithic catalyst supports consist of a ceramic support material with a coating of high surface material upon which the catalyst is actually deposited. In particular, the ceramic support is normally prepared by sintering a mold of clay or other ceramic material at a high temperature to impart density and strength. This procedure normally results in the ceramic's having a very low surface area, and consequently the ceramic is coated with another material having a higher surface area, as well as specific chemical characteristics, on which to actually deposit the catalyst. This procedure of depositing a high surface area "washcoat" on the low surface area ceramic wall is disclosed, for example in U.S. Pat. Nos. 2,742,437 and 3,824,196. The high surface area washcoats of these catalyst supports, however, often lose the surface area during their service lives because of the high temperatures, such as those of automotive exhaust gases, to which they are exposed.

Recently, monolithic supports in which the high surface area phase is incorporated within the ceramic structural phase itself have been developed. In these supports, (disclosed in co-pending commonly-assigned U.S. Ser. Nos. 712,875 and 712,886, both filed Mar. 18, 1985) the high surface area material is coextruded with the sinterable ceramic material in a single step, and remains as a discrete phase within the ceramic matrix after the monolith is fired. Catalyst supports of this kind eliminate several mechanical and physical problems of those having an exterior high surface area "washcoat", but could be susceptible to thermal degradation of the high surface area phase because of exposure to elevated service temperatures. Additionally, because it is coextruded with the ceramic material, the high surface area oxide phase is present during firing of the ceramic and is therefore exposed to the high temperatures involved in that process as well. It is therefore desirable to use an oxide support material that can retain high surface area despite exposure to elevated temperatures during firing or in service.

Alumina and silica mixtures have been used as the supporting material for catalysts. British Pat. No. 1,581,628 broadly discloses the use of alumina-silica mixtures as an external washcoat support for catalysts, but discloses no specific compositions or particular preparations. U.S. Pat. No. 4,129,522 discloses the preparation of hydrogel spheres of 27–75% by weight alumina; 75–25% by weight silica. These spheres are taught to be useful as catalyst supports, but neither preparation nor service temperatures above 760° C. are disclosed, and the patent contains no disclosure of use in a monolithic support structure. U.S. Pat. No. 4,151,121 discloses the use of alumina-silica mixtures containing 5–40% by weight alumina, prepared by gelation methods, as a catalyst support phase for incorporation into a granulated catalyst support. U.S. Pat. No. 3,637,525 discloses a monolithic catalyst support in which an alumina-silica mixture is combined with boron phosphate to form a singular structural/supporting phase for the catalytic materials. The alumina/silica mixture is prepared by coprecipitation or cogelation of alumina and silica in a weight ratio of 1.5:1 to 9:1.

It is an object of the present invention to provide an improved monolithic catalyst support having a strong structural phase of a sintered ceramic material and a second phase of a high surface area support material integral therewith which resists thermal degredation in service. It is a further object of the present invention to provide a monolithic catalyst support of this kind in which the support phase retains high surface area even when subjected to elevated temperatures used in ceramic firing processes. These and other objects are met by the invention to be described.

SUMMARY OF THE INVENTION

The present invention provides an improved monolithic catalyst support structure comprising a structural phase of a sintered ceramic and a high surface area support phase of a porous oxide integral with the structural phase, wherein the porous oxide support phase consists essentially of 50–93% by weight alumina and 7–50% by weight silica.

The alumina-silica phase of the present invention retains high surface area despite being subjected to elevated temperatures of ceramic firing and catalytic service. Surprisingly, the physical mixture of alumina and silica used as the support phase of this invention retains higher surface area than either of the components would retain if individually exposed to such conditions. Catalytic activity, which is dependent on surface area, is therefore maintained to a degree greater than that heretofore attainable under similar conditions. Increased effectiveness of the catalytic activity in such catalyst support structures as automobile catalytic converters can provide such benefits as increased fuel efficiency.

DETAILED DESCRIPTION OF THE INVENTION

The improvements embodied by the present invention relate to the finding that a physical mixture of alumina and silica can be used as the high surface area phase of a catalyst support system, and despite being subjected to conditions that normally result in thermal degredation, the mixture retains higher surface area per unit of weight than would either component individually. By intimately mixing finely divided powders of alumina and silica, it is believed that sintering of either one is impeded by the presence of the other, and the presence of silica retains the alumina substantially in the more desirable, higher surface area, transition forms.

According to the present invention, the high surface area catalyst support phase of a catalyst-supporting system such as a monolith consists essentially of about 50–93% by weight alumina and about 7–50% by weight sililca (that is, an alumina:silica molar ratio of about 1:1.7 to about 7.8:1). The weight and mole proportions are determined on the basis of dry, calcined alumina and silica. The alumina and silica materials preferred for use are those which, after drying and calcining, have a surface area of at least 40 square meters per gram of weight ($m^2/g$), more preferably at least 100 $m^2/g$ and most preferably at least 200 $m^2/g$. Preferably, the alumina and silica materials have a maximum crystallite size of 0.5 micron. (As used herein, "calcining" means heating a crystalline material to a temperature sufficient to eliminate water from the crystal lattice but below the temperature at which the material begins to lose substantial porosity or surface area.)

The aluminas useful in the preparation of the high surface area phase of this invention are those which, upon calcining, provide gamma-alumina or other transition aluminas having the specified surface area. Colloidal gamma-alumina can be used directly, or "alumina-precursors" such as alpha-alumina monohydrate can also be used. The colloidal gamma-alumina is generally in the form of particles not exceeding one micron. When alpha-alumina monohydrate is used, the particle size can be from less than one micron up to about 100 microns, but preferably the particle size does not exceed 50 microns. Suitable commercially available materials of this kind are Kaiser SA substrate alumina, available from the Kaiser Chemical Division of Kaiser Alumina Corporation; the CATAPAL and DISPAL aluminas available from the Chemical Division of Conoco Corporation; and the HYDRAL and "F" series of activated aluminas available from Alcoa Corporation. The high surface area silicas that can be used in the present invention are the amorphous silicas of sub-micron crystallite size such as CABOSIL colloidal silica, available from Cabot Corporation, and QUSO G-761 silica available from PQ Corporation. The most preferred alumina for use is the Kaiser SA Substrate alumina, and the most preferred silica for use is CABOSIL EH-5 silica.

According to the present invention, the high surface area phase of a catalyst-support monolith is prepared by mixing the alumina and silica in the proportions (dry calcined basis) indicated above. Preferred alumina/silica mixtures have a molar ratio of alumina to silica of from about 3:1 to 3:4 (about 55–85% by weight alumina). Most preferred is a molar ratio of about 3:2 (about 72% by weight alumina, but more generally about 65–75% by weight alumina). As mentioned, the aluminia and silica components are preferably in the form of a finely divided particulate, and are admixed either dry or in a dispersion, as explained more fully below, to substantial homogeneity.

The alumina/silica high surface area support phase of this invention is combined with the ceramic structural phase of a monolithic support, to integrate the support phase and structural phase, by any conventional method. In the most well-known method, the support material is applied to a preformed ceramic structure as an external washcoat. This is accomplished by providing a well-mixed slurry of compounds that are decomposable by heat to alumina and silica, and dipping the ceramic in the slurry or spraying it with the slurry, followed in either case by calcination to generate a tightly adherent coating of alumina and silica on the ceramic wall. In these methods, of course, the proportions of alumina-generating and silica-generating compounds in the slurry are such as will provide calcined alumina and silica in relative proportions within the above described ranges. Such "washcoat" procedures are described in U.S. Pat. Nos. 2,742,437 and 3,824,196, the disclosures of which are hereby incorporated by reference.

In a preferred manner of practice, the alumina/silica phase is coextruded with the ceramic material of the structural phase of the monolith and, after firing of the monolith, is embedded within the sintered ceramic material as a separate and discrete phase of high surface area material. Two procedures for accomplishing this are disclosed in copending U.S. application Ser. Nos. 712,886 and 712,875, both filed Mar. 18, 1985. The disclosures of these applications, commonly-assigned herewith, are incorporated by reference.

According to one procedure, the alumina/silica mixture is agglomerated and formed into coarse particles which are then coextruded with finely divided sinterable ceramic material into the desired monolithic shape. Firing the monolithic shape results in the alumina/silica mixture's being present within the sintered ceramic as discrete discernible particles.

The agglomerates are prepared by mixing the alumina and silica or their "precursors" with a binder. The binder can be any material which will agglomerate the materials for preparation of the coarse particles, for embedding in the ceramic monolith as a separate discontinuous phase, but which will normally burn off at or before the sintering temperature of the ceramic. The binder can be any of the well-known materials for this purpose. Examples are thermosetting resins such as epoxies, polyfurfuryl alcohol, silicone resins, phenolic resins, diallyl phthalate, or polyester resins; or a thermoplastic resin such as poly(acrylonitrile), polycarbonates, polyethylene, polymerized ethylenically-unsaturated monomers such as poly(methyl methacrylate) or polystyrene, polyvinyl alcohol, or hydrated methyl cellulose. Most preferred for use as the binder are methyl cellulose, polyvinyl alcohol, or polymerized furfuryl alcohol.

The agglomerates are prepared by combining the alumina and silica powders with the binder to form a homogeneous or substantially homogeneous mixture. The amount of binder used is such as will cause the powders to mass together. Normally 5–60 parts by weight of binder are used per 100 parts by weight of oxide powder. It is preferred to use only about 5–15 parts by weight, although when polymerized furfuryl alcohol is used, the higher levels are sometimes necessary to thoroughly wet and aggregate the powders.

The binders can be dispersed or dissolved in a suitable diluent, such as water in the case of methyl cellulose and polyvinyl alcohol, and the powders then added to form a thick slurry. In either case, the mixture of binder and powders is preferably mulled and then extruded to effect further mixing. Extrusion is generally into a shape, preferably "noodle" shape, which will facilitate drying of the extruded mass. As used herein, "drying" includes curing the binder, as may be necessary, or driving off any volatiles which may be present in the binder. Accordingly, the mass is dried at a temperature below the sintering temperature of the powders, preferably at room temperature up to about 250° C., and then pulverized to form the coarse particulate agglomerates. Any conventional pulverization techniques can be used, but use of a jaw crusher is preferred to attain the desired particle sizes. The particle sizes are preferably such that the median particle diameter is 50-250 microns, more preferably 55-100 microns. Generally, however, the particles are of a size that will not interfere with the subsequent preparation of the ceramic monolith but will result in the presence of a discernible discontinuous phase in the ceramic matrix.

The ceramic matrix, which forms the high-strength structural phase of the monolith, is comprised of any of the well known sinterable materials capable of providing mechanical strength and good thermal properties in monolithic supports as heretofore prepared by those skilled in the art. Preferably the ceramic is selected from cordierite, mullite, clay, talc, zirconia, zirconia-spinel, alumina, silica, lithium aluminosilicates, and alumina-zirconia composites. Mixtures of these can also be used to the extent that the chosen materials are compatible and will not degrade each other, as those skilled in the art will recognize.

The monolithic supports are prepared by mixing the sinterable ceramic materials with the agglomerate materials described above and, optionally, a binder. Generally about 15-50 parts by weight of the agglomerate particles will be combined with 50-85 parts by weight of the ceramic material. Preferably, 3-20 parts by weight of binder will also be used. Binder materials conventionally used in ceramic catalyst support manufacture are suitable. Examples are disclosed in:

"Ceramics Processing Before Firing," ed. by George Y. Onoda, Jr. & L. L. Hench, John Wiley & Sons, New York "Study of Several Groups of Organic Binders Under Low-Pressure Extrusion," C. C. Treischel & E. W. Emrich, *Jour. Am. Cer. Soc.*, (29), pp. 129-132, 1946

"Organic (Temporary) Binders for Ceramic Systems,"S. Levine, *Ceramic Age*, (75) No. 1, pp. 39+, January 1960

"Temporary Organic Binders for Ceramic Systems," S. Levine, *Ceramic Age*, (75) No. 2, pp. 25+, February 1960

Preferred are methyl cellulose or a mixture of methyl cellulose and a silicone resin. The silicone resins preferred for use are Dow Corning Corporation's Q6-2230 silicone resin or those described in U.S. Pat. No. 3,090,691 to Weyer. The most preferred binder is methyl cellulose, available as METHOCEL A4M from the Dow Chemical Company. Up to about 1 percent by weight, based upon total mixture weight, of a surfactant, such as sodium stearate, can also be used to facilitate mixing and flow for subsequent processing. The mixing step should be performed in a liquid, such as water, which acts as a further plasticizer. When the binder is a silicone resin, it is preferred to use isopropyl alcohol in addition to water.

The most preferred ceramic materials are the pre-reacted cordierite and mullite. The ceramic material should be in particulate form, preferably of a size finer than 200 mesh (U.S. Standard) and most preferably finer than 325 mesh (U.S. Standard). The ceramic particles can be coarser than 200 mesh, but should be at least as fine as the agglomerate particles.

The monoliths are prepared by combining the components to form a homogeneous or substantially homogeneous mixture. Conventional mixing equipment can be used, but the use of a mix muller is preferred. To effect further mixing, the batch can subsequently be extruded through a "noodling" die one or more times. Ultimately, the batch is formed into the desired monolith shape, preferably by extrusion through a die.

According to the second procedure for incorporating the alumina/silica mixture into the monolith as a discrete discernable support phase, the alumina/silica mixture and a ceramic matrix material (as described above) are separately formed into moldable bodies by admixture with a substance that will bind those materials into a plasticized mass. This binder substance can be any of those described earlier in connection with preparation of the agglomerate/ceramic extrusion batch. A preferred binder is methyl cellulose.

The constituent materials (alumina and silica for the support bodies; ceramic material for the structural bodies) are separately mixed with sufficient binder to form a moldable mass. Generally, about 1-20 percent by weight, based on the alumina/silica or ceramic material weight, of the binder is used. Up to about 1 percent by weight, based upon the total body weight, of surfactant or lubricant such as sodium stearate can also be used to facilate mixing. The mixing step should be performed in a liquid, preferably water, which acts as a further plasticizer. When the binder is a silicone resin, it is preferred to use isopropyl alcohol in addition to water. Conventional mixing equipment can be used, but the use of a mix muller is preferred.

The plasticized masses of alumina/silica and those of ceramic material are separately molded or formed into discrete bodies which are then intermingled for coextrusion through a die to form the final desired shape of the monolithic catalyst support. Normally, the support bodies and structural bodies will be intermingled to form a composite body thereof in which the support bodies constitute a distinct, preferably discontinuous, phase throughout. The support bodies should also be uniformly or substantially uniformly distributed throughout the composite. To provide the proper distribution, there will normally be a ratio of ceramic structural bodies to alumina/silica support bodies of at least about 1.3:1, preferably at least 1.5:1. It is preferred, that the size and shape of the structural bodies and support bodies be about the same. Following this and the above-mentioned ratios, the monoliths formed from such a composite contain, as is preferred, about 10-40 percent by weight of the high surface area phase.

The composite can be of any size or shape so long as the support bodies are uniformly or substantially uniformly distributed throughout and are present therein in a distinct phase and so long as the composite can be extruded through a die to form the final monolith shape. It is also to be understood that the manner of forming the composite can be by any means by which these criteria are substantially met.

In a preferred embodiment of this procedure, the plasticized masses of alumina/silica and those of ceramic material are separately extruded through a rod die into bodies of elongate shape, preferably of rectangular, hexagonal, or circular cross-section. The extruded bodies are then assembled into a single composite body by intermingling the rods axially or longitudinally. Most preferably, this will be done so that the rods are substantially parallel. The support bodies are positioned to be uniformly or substantially uniformly distributed through the composite. To provide the proper distribution, there will normally be a ratio of ceramic structural bodies to alumina silica support bodies of at least 1.5:1, preferably at least about 2:1 in the composite. After firing, monoliths formed from such a composite will contain, as is preferable, about 10–40 percent by weight of the high surface area alumina/silica phase. Ultimately, the composite is extruded through a die to form the desired shape of the final monolith.

Both this procedure and the one described above relating to the use of agglomerates are well suited for the preparation of monoliths in the shape of honeycombs. The "green" monolith shapes formed by either of these procedures are heated to a temperature and for a time sufficient to sinter the ceramic material. Optionally, this heating/sintering step can be preceded by drying the monolith shapes at about 100°–120° C. The heating/sintering step generally takes place at 800°–1200° C., although preferably the temperature does not exceed about 1100°–1150° C. Despite the temperatures used to sinter the ceramic, the embedded alumina/silica support phase of this invention contains high surface area and preferably provides the monolithic support with an overall surface area of at least 8–10 $m^2/g$, more preferably at least 15–20 $m^2/g$.

The improvements of the present invention are also applicable to monolithic support structures in which the ceramic phase is formed from a precursor of alumina, silica, titania, or zirconia. In the preparation of such monolithic supports, the alumina/silica mixture of the present invention is mixed with one or more of the aforementioned precursor materials (which are normally in the form of a dispersion, suspension, or solution in a liquid diluent) and a temporary binder to form a substantially homogeneous body which is shaped and fired to form the support. The precursors generate the actual ceramic material at or below the firing temperature of the shaped body. The alumina/silica mixture is dispersed throughout the sintered and densified ceramic phase generated by the precursors and provides a second phase of high surface area support material.

The improvement provided by the present invention is particularly important in the preparation of monolithic supports in which the high surface area support phase is exposed to the elevated temperatures necessary to sinter the ceramic material. One particularly preferred alumina/silica mixture contains Kaiser SA substrate alumina and CABOSIL silica in an alumina:silica molar ratio of 3:2. When this mixture is heated to 1200° C. for a six hour period, it retains a surface area of 53 $m^2/g$. In contrast, the silica subjected individually to those conditions retains a surface area of 0.4 $m^2/g$, and the alumina individually subjected to those conditions retains a surface area of 8.4 $m^2/g$.

The improved monolithic supports of this invention may have some catalytic activity of their own by virtue of the chemistry and structure of the high surface area alumina/silica phase. The support may further carry additional catalytically active ingredients on the surface area provided by the alumina/silica support phase. These additional catalytic ingredients can be incorporated into the monolith by methods known in the art. The improved monolithic supports are useful in most applications in which it is necessary to catalytically convert undesirable components in a gas stream prior to the stream's further processing or exhaustion to the atmosphere. The alumina/silica support phase of this invention is also useful in biological applications, such as enzyme processes, in which high surface area substrates are desirable, and in carrying out catalytically activated reactions for the manufacture of chemicals.

The following examples are illustrative, but not limiting, of the invention.

EXAMPLE 1

Compositions of alumina and silica were prepared from the ingredients indicated in Table 1A. Figures in Table 1A are in parts by weight. The ingredients were intimately dry-mixed, then wet-mixed with water, followed by drying and reduction to particulate form. The resultant powder formulations were fired at 1000° C., 1100° C., and 1200° C. for six hours. Some of the formulations were also fired at 1000° C. or 1200° C. for 300 hours to determine the effect of extended exposure to elevated temperatures. The surface area of the fired powder formulations is indicated in Table 1B. The alumina materials used in this example were hydrated aluminas having a weight loss-on-ignition of about 24–28%. Accordingly, the weight of alumina generated by the materials after firing is less than the indicated weight of the alumina ingredient itself. Examples 1A and 1B are included as controls, the composition being either 100% alumina (1A) or 100% silica(1B). It can be seen that examples 1D through 1G, which are compositions of the alumina used in control example 1A and the silica used in control example 1B, retain considerably higher surface area after exposure to 1200° C. for six hours than does either the alumina or silica alone when subjected to the same conditions. A particularly preferred embodiment of the invention is depicted in Example 1F.

TABLE 1A

| Ingredient | Example Number | | | | | | | | |
| --- | --- | --- | --- | --- | --- | --- | --- | --- | --- |
| | 1A | 1B | 1C | 1D | 1E | 1F | 1G | 1H | 1I |
| Kaiser SA hydrated $Al_2O_3$ | 100 | — | — | 93.3 | 87.4 | 77.7 | 63.5 | — | 93.3 |
| Conoco DISPAL M hydrated $Al_2O_3$ | — | — | 63.5 | — | — | — | — | — | — |
| Cabot CABOSIL EH-5 Amophous $SiO_2$ Crystallite Size 0.007 micron | — | 100 | 36.5 | 6.7 | 12.6 | 22.3 | 6.5 | 16.9 | — |
| PQ Corp QUSO G-761 hydrophlic $SiO_2$ mean crystallite size 0.015 micron | — | — | — | — | — | — | — | — | 6.7 |
| Alcoa HYDRAL 710 | — | — | — | — | — | — | — | 83.1 | — |

TABLE 1B

| | Surface Area (m²/g) Firing Data (°C./hours) | | | | |
|---|---|---|---|---|---|
| Example | 1000/6 | 1100/6 | 1200/6 | 1000/300 | 1200/300 |
| 1A | — | — | 8.4 | — | — |
| 1B | — | — | 0.4 | — | — |
| 1C | 100 | 63 | 21 | — | — |
| 1D | 122 | 104 | 61 | 117 | — |
| 1E | 123 | 99 | 57 | 118 | — |
| 1F | 164 | 105 | 54 | 118 | — |
| 1G | 158 | 92 | 43 | 104 | — |
| 1H | — | — | 22 | — | — |
| 1I | 116 | 79 | 36 | 110 | 16 |

EXAMPLE 2

This example illustrates the preparation of high surface area agglomerates based on alumina and silica. The alumina ingredient was Kaiser SA Substrate Alumina, a hydrated alumina which, after heat treatment at 600° C. for one hour, has a weight loss-on-ignition of 27 percent and provides gamma-alumina having a surface area of about 300 m²/g. The silica ingredient was CABOSIL EH-5 silica (Cabot Corp.), an amorphous silica having a surface area of 400 m²/g and a median crystallite size of 0.007 micron.

93.3 parts by weight of the alumina and 6.72 parts by weight of the silica were pre-mixed in a plastic jar on a roller for two hours, About 6 percent by weight of methyl cellulose, based on the alumina-silica total weight, was dispersed separately in distilled water which had been heated to 80° C. When the methyl cellulose was sufficiently dispersed, the alumina-silica mixture was added. The resultant mixture was stirred by hand and additional water was added, bringing the total water content to 90 parts by weight, until a thick slurry was produced. The slurry was dried overnight at 175° C. to form a hard cake. The cake was crushed into particles of various dimensions for use in Examples 3–5, following.

EXAMPLES 3–5

In these examples, compositions of the following ingredients were prepared, as described in the table below, for the fabrication of honeycomb monolithic supports. Figures represent parts by weight.

| INGREDIENT | EX-AMPLE 3 | EX-AMPLE 4 | EX-AMPLE 5 |
|---|---|---|---|
| Methyl Cellulose | 4 | 4 | 4 |
| Sodium Stearate | 0.5 | 0.5 | 0.5 |
| Distilled Water | 43.8 | 40.6 | 41.3 |
| Pre-reacted Cordierite | | | |
| m.p.s.* 7.9 microns | 50.0 | 60.0 | 60.0 |
| m.p.s.* 6.8 microns | 10.0 | — | — |
| Example 2A Agglomerates | | | |
| m.p.s.* 80.5–84 microns | 40.0 | 40.0 | — |
| m.p.s.* 62 microns | — | — | 40 |

*median particle size

For each example, the compositions were formulated by combining all ingredients but the water in a plastic jar. The jar contained 1-inch diameter balls from a standard ball mill, 6 balls per 800 grams of material. The jar was rotated until the ingredients were well mixed, after which the ingredients were placed in a mix muller with the water and further mixed until a plasticized batch was attained. The batch was extruded several times through a noodle die to distribute the agglomerate particles throughout the mixture. The compositions of Examples 3 and 4 were extruded through a die to produce honeycomb shapes having 200 square openings per square inch with a wall thickness of 12 mils. The composition of Example 5 was extruded through a die to produce honeycomb shapes having 400 square openings per square inch with a wall thickness of 5 mils. Honeycomb shapes of each example/composition were heated at various temperatures between 1000°–1200° C. for four hours to sinter the ceramic material. Agglomerate particles of Example 2 were also separately heated so that their characteristics could be ascertained. The physical characteristics, according to heating temperatures of the monoliths and agglomerates above, are shown in the table below.

| EXAMPLE | Heating Temp (°C.) 4 Hours | Porosity Percent[1] | Thermal Expansion Coefficient[2] 25–1000° C. (1/°C.) | Axial Crushing Strength (PSI) | BET Surface Area (m²/g) |
|---|---|---|---|---|---|
| 3 | 1000 | — | — | — | 60 |
|   | 1100 | 47 | 30 × 10⁻⁷ | 350 | 33 |
|   | 1150 | 46 | 27 | 450 | 17 |
|   | 1200 | 48 | 29 | — | 7 |
| 4 | 1000 | — | — | — | 55.5 |
|   | 1100 | 42 | 32 | 840 | 39 |
|   | 1150 | 43 | 34 | 1080 | 19 |
|   | 1200 | 44 | 30 | 2020 | 8.5 |
| 5 | 1000 | — | — | — | 57 |
|   | 1100 | 39 | 28 | 350 | 35.5 |
|   | 1200 | 43 | 31 | 550 | 10.5 |
| 2 | 1100 | — | — | — | 100 |
|   | 1150 | — | — | — | 80 |
|   | 1200 | — | — | — | 54 |

[1]Measured with a Mercury Porosimeter.
[2]Measured with a sapphire dilatometer.

EXAMPLE 6

In this example, the following materials were used to form ceramic matrix structural bodies and alumina/silica support bodies for co-extrusion into monolith form.

| Ceramic Material | Alumina-silica Mixture |
|---|---|
| Pre-reacted cordierite, | 3:1 mole ratio, dry |

| Ceramic Material | Alumina-silica Mixture |
|---|---|
| particle size finer than 200 mesh | basis, using Kaiser SA alumina and CABOSIL EH-5 silica |

The alumina/silica material and ceramic material were mixed separately in a mix muller with an additional 6% by weight of METHOCEL A4M methyl cellulose and 0.5% by weight of sodium stearate as lubricant. Distilled water was added to further plasticize the mass. The two mixtures were extruded separately through a noodle die and then, still segregated, through a hexagonal die, to form rods having a hexagonal cross-section with 0.25-inch sides.

The extruded rods were assembled in a jig in the form of a single composite hexagon, using 24 ceramic material rods and 13 alumina/silica rods. The composite was extruded several times through a hexagonal rod die to reduce the cross-sectional area of the alumina/silica phase and to distribute it through the ceramic material phase. The composite was then extruded through a die to produce a honeycomb shape having 400 square openings per square inch with a wall thickness of 7 mils.

The honeycomb shapes were wrapped in aluminum foil and steam dried at 110° C. for 16 hours, and then heated at various temperatures for 4 hours to sinter the ceramic matrix phase. Hexagonal rods of the alumina/silica support material were also heated under similar conditions so that their separate characteristics could be ascertained. The surface areas of the honeycomb monoliths and the rods, according to heating temperature, are shown in the following Table.

| Heating Temp. (°C.) | BET Surface Area ($m^2/g$) |
|---|---|
| alumina/silica rods | |
| 1000 | 94.6 |
| 1100 | 75.0 |
| 1150 | 64.4 |
| 1200 | 52.1 |
| 1250 | 31.8 |
| honeycomb | |
| 1000 | 22.8 |
| 1100 | 13.8 |
| 1150 | 6.9 |
| 1200 | 4.0 |
| 1250 | 1.4 |

We claim:

1. An improved monolithic catalyst support structure comprising a structural phase of a sintered ceramic material and a high surface area support phase of a porous oxide integral with the structural phase, wherein the porous oxide support phase consists essentially of 50–93% by weight alumina and 7–50% by weight silica.

2. An improved monolithic support of claim 1 in which the sintered ceramic phase is substantially continuous and in which the high surface area support phase is a substantially discontinuous, discrete, discernible phase embedded in the ceramic phase.

3. An improved monolithic support of claim 2 in which the monolith has a surface area of at least 15 $m^2/g$.

4. An improved monolithic support of claim 3 in the shape of a honeycomb.

5. An improved monolithic support of claim 1 wherein the support phase consists essentially of 55–85% by weight of alumina and 15–45% by weight of silica.

6. An improved monolithic support of claim 5 in which the sintered ceramic phase is substantially continuous and in which the high surface area support phase is a substantially discontinuous, discrete, discernible phase embedded in the ceramic phase.

7. An improved monolithic support of claim 6 in which the monolith has a surface area of at least 15 $m^2/g$.

8. An improved monolithic support of claim 7 in the shape of a honeycomb.

9. An improved monolithic support of claim 1 wherein the support phase consists essentially of 65–75% by weight alumina and 25–35% by weight silica.

10. An improved monolithic support of claim 9 in which the sintered ceramic phase is substantially continuous and in which the high surface area support phase is a substantially discontinuous, discrete, discernible phase embedded in the ceramic phase.

11. An improved monolithic support of claim 10 in which the monolith has a surface area of at least 15 $m^2/g$.

12. An improved monolithic support of claim 11 in the shape of a honeycomb.

13. An improved monolithic support of claim 3 wherein (1) the alumina is formed from a hydrated alumina, said hydrated alumina characterized in that it converts to a transition alumina having a surface area of at least about 300 $m^2/g$ after calcination at a temperature of 600° C. for one hour; and (2) the silica is formed from an amorphous silica having a crystallite size no larger than 0.02 micron and a surface area of at least 200 $m^2/g$.

14. An improved monolithic support of claim 7 wherein (1) the alumina is formed from a hydrated alumina, said hydrated alumina characterized in that it converts to a transition alumina having a surface area of at least about 300 $m^2/g$ after calcination at a temperature of 600° C. for one hour; and (2) the silica is formed from an amorphous silica having a crystallite size no larger than 0.02 micron and a surface area of at least 200 $m^2/g$.

15. An improved monolithic support of claim 11 wherein (1) the alumina is formed from a hydrated alumina, said hydrated alumina characterized in that it converts to a transition alumina having a surface area of at least about 300 $m^2/g$ after calcination at a temperature of 600° C. for one hour; and (2) the silica is formed from an amorphous silica having a crystallite size no larger than 0.02 micron and a surface area of at least 200 $m^2/g$.

* * * * *